United States Patent [19]

Imao et al.

[11] Patent Number: 5,042,153
[45] Date of Patent: Aug. 27, 1991

[54] METHOD FOR PRODUCING A SLIDING PART

[75] Inventors: Eiichi Imao, Nagoya; Nobuo Kobayashi, Toyota; Hideaki Takahashi, Toyota; Motohiro Mizuno, Toyota; Takeshi Onogi, Toyota, all of Japan

[73] Assignee: Toyota Jidosha Kabushiki Kaisha, Toyota, Japan

[21] Appl. No.: 488,369

[22] Filed: Feb. 22, 1990

Related U.S. Application Data

[60] Continuation of Ser. No. 158,045, Feb. 16, 1988, abandoned, which is a division of Ser. No. 911,059, Sep. 24, 1986, abandoned.

[51] Int. Cl.$^5$ .............................................. B21D 53/10
[52] U.S. Cl. ................................ 29/898.12; 29/898.13; 29/527.2
[58] Field of Search ............ 29/898.43, 898.07, 898.12, 29/898.13, 527.2, 530; 264/130, 242, 264, 268, 269, 261, DIG. 56, DIG. 61; 384/41, 42, 296, 297, 299, 909

[56] References Cited

U.S. PATENT DOCUMENTS

| | | | |
|---|---|---|---|
| 1,870,867 | 8/1932 | Pike et al. | 384/296 |
| 2,227,969 | 1/1941 | Haushalter | 29/149.5 NM |
| 2,459,598 | 1/1949 | Stott | 29/149.5 NM |
| 2,697,645 | 12/1954 | Mitchell | 29/898.12 X |
| 2,954,992 | 10/1960 | Baker | 264/242 X |
| 3,363,300 | 1/1968 | Stec, Sr. | 264/242 X |
| 3,498,363 | 3/1970 | Spindler | 29/898.12 X |
| 3,660,881 | 5/1972 | Viner et al. | 29/898.12 X |
| 3,764,647 | 10/1973 | McDow | 264/242 |
| 3,805,552 | 4/1974 | Heald | 384/42 |
| 3,904,731 | 9/1975 | Orkin et al. | 264/242 |
| 3,941,495 | 3/1976 | Duncan | 264/242 X |
| 4,319,790 | 3/1982 | Thomson | 384/297 |
| 4,397,910 | 8/1983 | Benson et al. | 384/297 |

FOREIGN PATENT DOCUMENTS

| | | |
|---|---|---|
| 45-7081 | 3/1970 | Japan . |
| 55-24290 | 2/1980 | Japan . |
| 56-59030 | 5/1981 | Japan . |
| 59-112613 | 7/1984 | Japan . |
| 60-178013 | 9/1985 | Japan .................... 264/261 |

Primary Examiner—Timothy V. Eley
Attorney, Agent, or Firm—Finnegan, Henderson, Farabow, Garrett & Dunner

[57] ABSTRACT

A sliding part produced by monomer casting. The sliding part consists of a bearing, a shaft which is rotatably or reciprocatably supported by and fitting into the bearing, and a resin lining formed on the bearing surface of the bearing. The resin lining is formed by pouring a low-viscosity monomer or prepolymer into the clearance between the bearing surface and the shaft and permitting the monomer or prepolymer to polymerize or cure in situ. The shaft is slidable on the resin lining.

1 Claim, 3 Drawing Sheets

METHOD FOR PRODUCING A SLIDING PART

This application is a continuation application under 37 CFR 1.62 of pending prior application Ser. No. 07/158,045 filed Feb. 16, 1988, now abandoned which is a divisional of application Ser. No. 05/911,059, filed Sept. 24, 1986, now abandoned.

BACKGROUND OF THE INVENTION

1. Field of the Invention

The present invention relates to a sliding part and a method for producing the same, said sliding part consisting of a shaft and a bearing, the former fitting into the latter, such as a combination of a journal and a journal bearing and a combination of a spline shaft (internal spline) and a hub (external spline). More particularly, the present invention relates to a sliding part in which a resin lining is formed on the bearing surface of the bearing by monomer casting, and it also relates to a method for producing the sliding part.

2. Description of the Prior Art

Sliding parts with a resin lining have been in general use in automobiles and many other machines. The conventional sliding parts fall under two broad categories: (A) There are sliding parts constructed of a shaft, a bearing and a bushing interposed between them, said bushing being formed by coating a flat, metal plate with a resin, cutting the coated plate to proper size, curling the cut plate, and fitting the curled plate into the bearing surface of the bearing, as in the case of a Teflon resin-coated bushing. (B) There are sliding parts constructed of a bearing with the bearing surface thereof directly coated with a resin and a shaft machined to fit into the bearing.

The sliding parts belonging to category (A) have the following disadvantages: (1) Both the lining and the shaft should have a considerably high dimensional accuracy, which sometimes needs the selective fitting of accurately matching parts. (2) Depending on the shape of the bearing surface, it may be difficult to fit the lining. (3) The production cost of the lining is high. On the other hand, the sliding parts belonging to category (B) have the following disadvantages. (1) The machining of the shaft is indispensable, which adds to the cost of the sliding part. (2) The machining of the shaft should be performed with high accuracy and selective fitting may be necessary in some instances.

SUMMARY OF THE INVENTION

It is an object of the present invention to provide a sliding part having a highly accurate clearance at sliding interfaces and outstanding sliding performance.

It is another object of the present invention to provide a method for producing with ease and certainty a sliding part of high accuracy and high performance regardless of the dimensional accuracy of the shaft and bearing.

The present invention is based on the so-called monomer casting in which a molded item is produced by casting a monomer, followed by polymerization and curing, as employed in the case of nylon monomer casting.

The sliding part of this invention comprises a bearing, a shaft which is rotatably or reciprocatably supported by and fitting into the bearing, and a lining of resin formed on the bearing surface of the bearing. The resin lining is formed by pouring a low-viscosity monomer or prepolymer into a clearance between the bearing surface and the shaft and permitting the monomer or prepolymer to polymerize or cure in situ. The shaft slides on the resin lining.

The shaft may constitute an internal spline and the bearing an external spline. Either the external spline or the internal spline may be provided with a groove constituting a well for receiving resin poured into the clearance between the external and internal splines. The resin lining may be a thin film of polyamide resin, urethane resin, epoxy resin or polyester resin.

The method of this invention for producing the sliding part by monomer casting is accomplished by pouring a low-viscosity monomer or prepolymer into a clearance between a shaft and the bearing surface of a bearing. The shaft is fitted into the bearing and is rotatably or reciprocatably supported by the bearing and specifically the bearing surface. After polymerization and curing, the monomer forms a resin lining on the bearing surface of the bearing, and the shaft slides on the resin lining.

Figure 1:
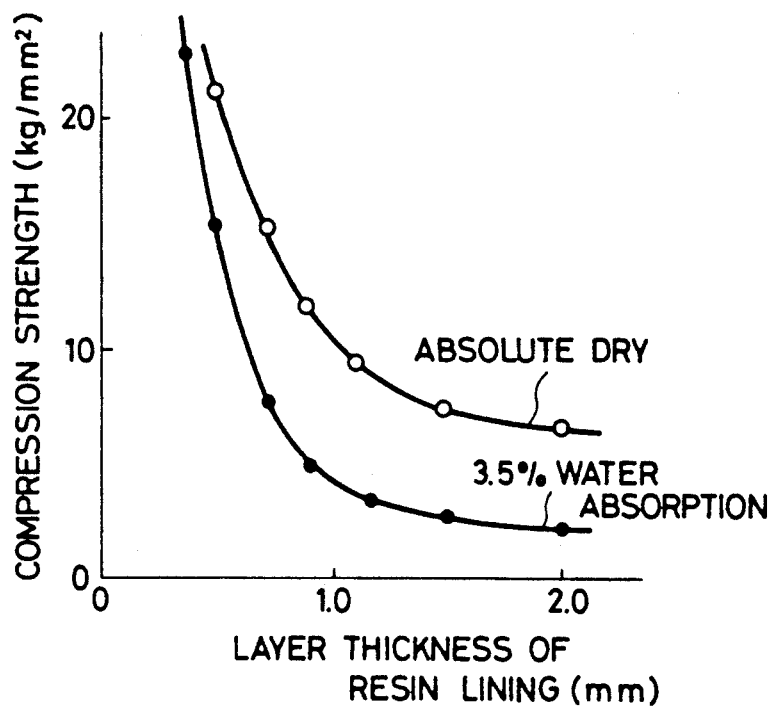
FIG. 1 is a graph showing the relation between the thickness and the compression strength of the resin lining of the present invention.

The accompanying drawings, which are incorporated in and constitute a part of this specification, illustrate embodiments of the invention and, together with the description, serve to explain the principles of the invention.

DESCRIPTION OF THE PREFERRED EMBODIMENTS

The sliding part of this invention is produced in the following manner. At first, a shaft is fitted into a bearing and rotatably or reciprocatably supported by the bearing, primarily in the axial direction. The bearing may be separate and independent or integral with the machine proper. Next, a monomer or a low-viscosity prepolymer of a suitable resin, such as polyamide resin, urethane resin, epoxy resin or polyester resin, which may be incorporated with a polymerization initiator according to need, is poured into the clearance between the shaft and the bearing surface of the bearing. The monomer or prepolymer is polymerized or cured by heating or irradiation. A resin lining is thus formed on the bearing surface in the existing clearance between the shaft and the bearing surface of the bearing. Prior to the pouring of a monomer, the bearing should be provided with proper masking excluding the bearing surface, because it is difficult to remove the unnecessary resin lining after polymerization. For the uniform, smooth polymerization of the monomer, it may be desirable to preheat the shaft and bearing to a temperature suitable for polymerization prior to the pouring of the monomer. In addition, it is also desirable to apply a proper primer to the bearing surface of the bearing and a proper mold release to the shaft. The primer ensures the firm adherence of the resin lining to the bearing surface of the bearing. The polymerization initiator should be properly selected according to the monomer used. For example, for caprolactam (monomer or nylon-6), lactam anion and acyl lactam are recommended.

The polymerization of the monomer is usually accompanied by a certain degree of molding shrinkage. This molding shrinkage gives rise to a very small amount of clearance between the shaft and the resin lining when the resin lining is formed. The amount of clearance is as follows in the case where the resin lining is made of nylon-6. The molding shrinkage of nylon-6 is 14 to 16% (by volume) and it corresponds to a linear shrinkage of 4 to 5% across the thickness or cross-section when nylon-6 is used as a thin film. If the clearance between the shaft and the bearing surface is about 0.2 mm and the resin lining of nylon-6 is formed in the clearance, the shrinkage of nylon-6 is about 8 to 10 um. It follows, therefore, that a very small amount of clearance (about 8 to 10 um) is formed between the shaft and the resin lining. Such a small anmount of clearance will be possible only with with extremely accurate machining. According to the present invention, the high precision clearance can be obtained easily even though the shaft and the bearing are characterized by low dimensional accuracy. The sliding part of the present invention is formed in situ, and according to the method of the invention, it is not necessary to select a shaft and a bearing that mate with each other. In addition, it is not necessary to machine the shaft and the bearing to high accuracy to achieve a close fit.

In spite of the good sliding characteristics, resin linings have not been effectively utilized for sliding parts that generate significant frictional heat resulting from repeated sliding motion because of the following disadvantages. Resins undergo a great amount of creep or deformation at high temperatures, and they exhibit low thermal conductivity, which is responsible for their low critical PV value. In this invention, these disadvantages are eliminated. The resin lining produced in accordance with this invention in the form of a thin film between the shaft and the bearing has a greatly increased compression strength resulting from the support provided by the bearing metal. In the case of resin lining made of nylon-6, the compression strength remarkably increases if the lining is thinner than about 0.6 mm, as shown in FIG. 1. In addition, such a thin resin lining permits rapid heat dissipation and consequently provides an improved critical PV value. Thus the sliding part of this invention has high performance. That is, the resin lining fully utilizes the sliding characteristics of the resin; the resin lining is greatly improved in compression strength and resistance to deformation; and the resin lining permits rapid heat dissipation, providing an improved critical PV value. The sliding part of the invention is produced simply by pouring a monomer into the clearance between the sliding interfaces, which results in low production cost. The sliding part of this invention may be advantageously applied to various functional parts where sliding motion frequently and repeatedly takes place, such as a crank shaft and crank journal bearing, cam shaft and cam-shaft journal bearing, and transmission.

According to the method of this invention, the resin lining is formed in situ by monomer casting. Since the resin lining is in the form of a thin layer, a sliding part with high accuracy and high performance can be produced regardless of the dimensional accuracy of the associated shaft and bearing. In addition, the monomer casting can be accomplished without the application of pressure and heat, and consequently the sliding part can be produced easily and at a low cost.

The invention is described with reference to a slide spline consisting of an internal spline and an external spline. Nylon monomer is poured into the clearance between the two components and cured therein so that a resin lining is formed on either of the two components. In the preferred slide spline, at least either the internal spline or external spline is provided with a groove to receive excess monomer so that no flash is formed. The absence of flash eliminates the need for fabrication operations, such as deflashing, which impairs the product precision and slide performance.

SPECIFIC EXAMPLES

Example 1

Figure 2:
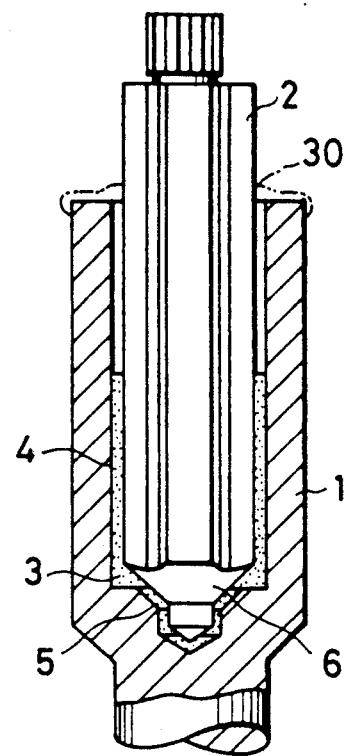
FIG. 2 is a sectional view of the sliding part of Example 1 of this invention.
Figure 3:
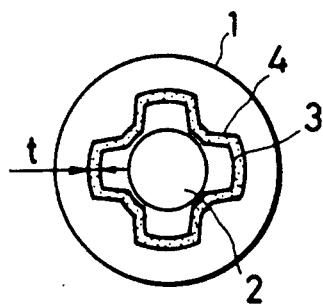
FIG. 3 is a plan view of the sliding part as shown in FIG. 2.

In FIGS. 2 and 3, there is shown an external spline 1 and an internal spline 2 which is fitted into and reciprocatably supported by the external spline. There is also shown a resin lining 3 of nylon-6 formed on the inner surface 4 of the external spline 2. A centering pin 6 and centering hole 5 are provided at an end of the internal spline 2.

The sliding part in this example was produced as follows: First, the external spline 1 was coated with a primer and the internal spline 2 was coated with a release agent. The external spline 1 and the internal spline 2 were preheated to 130° to 160° C. within which temperature range the monomer of nylon-6 polymerizes. A proper amount of the monomer of nylon-6 containing the polymerization initiator (lactam anion and acyl lactam) was poured into the external spline 1, and then the internal spline 2 was fitted into the external spline 1, whereby the clearance (t=about 0.2 mm) between the external spline and the internal spline was filled with the nylon monomer. The nylon monomer was polymerized at a temperature of 130° to 160° C. This resulted in the formation of a resin lining 3 on the surface 4 of the external spline 1. The sliding part thus produced allowed the internal spline 2 to slide on the resin lining 3 without any play.

Example 2

Figure 4:
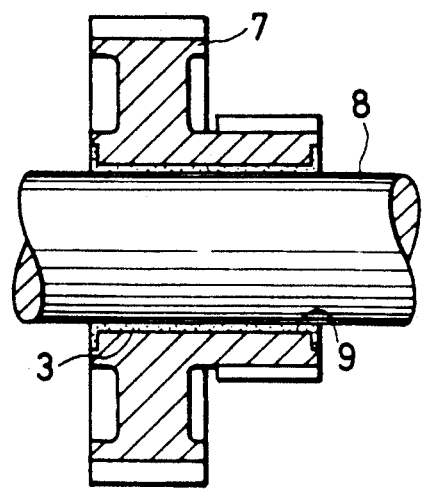
FIG. 4 is a sectional view of the sliding part of Example 2 of this invention.

In this example, the sliding part of the invention was applied in the production of a manual transmission gear, as shown in FIG. 4. This gear has a bearing 7, a shaft 8 fitted into the bearing and rotatably supported by the bearing, and a resin lining 3 of nylon-6 which is formed on the bearing surface 9 of the bearing 7 in the same manner as in Example 1. This sliding part exhibited outstanding sliding performance without any play.

Example 3

Figure 5:
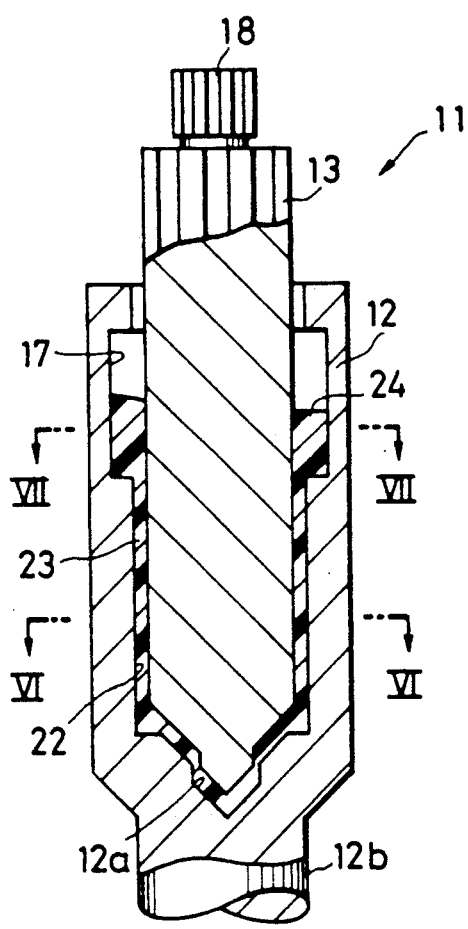
FIG. 5 is a sectional view of the sliding part of Example 3 of this invention.
Figure 7:
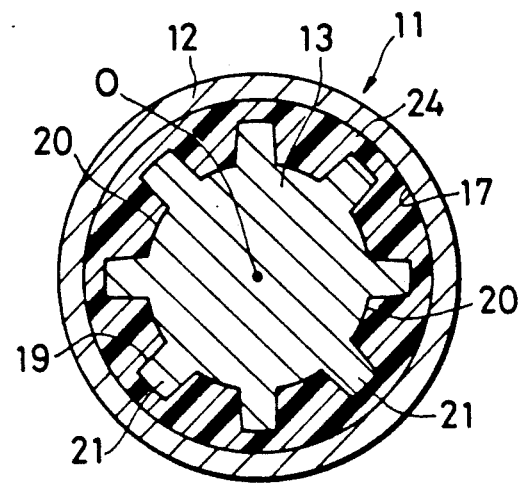
FIG. 7 is an enlarged sectional view taken along the line VII—VII of FIG. 5.
Figure 6:
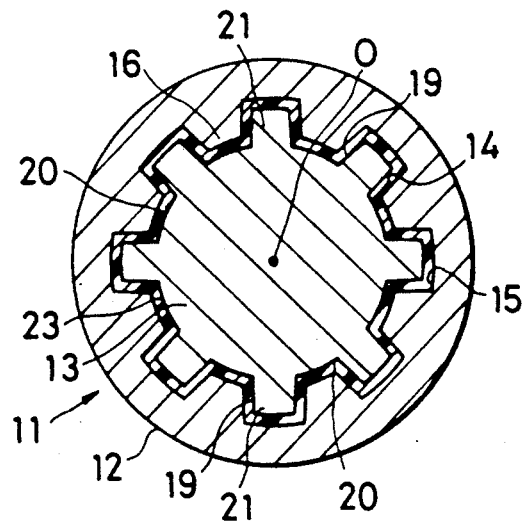
FIG. 6 is an enlarged sectional view taken along the line VI—VI of FIG. 5.

In this example, the sliding part of the invention was applied in the production of a slide spline 11 as shown in FIGS. 5 to 7. This slide spline has an external spline 12 and an internal spline 13 slidably fitted into the external spline 12. The external spline 12 has a cylindrical shape with a bottom 12a. The inner surface of the cylinder has spline serrations 14 extending in the longitudinal direction. The spline serrations 14 are defined by squares 15 and trapezoids 16 projected and recessed alternatively at regular intervals on the periphery. The bottom 12a of the cylinder is connected to a rod 12b having an end attached to an additional component (not shown). A groove 17 as best shown in FIG. 5, is formed at the upper inside of the external spline 12 and serves as a well for excess resin.

The internal spline 13 has a cylindrical shape with a base attached to an additional component (not shown) through the fixing member 18. The external surface of the cylinder has spline serrations 19 extending in the longitudinal direction. The spline serrations 19 are defined by squares 20 and trapezoids 21 projected and recessed alternately at regular intervals on the periphery.

The internal spline 13 is fitted into the external spline 12 so that a clearance 22 is formed between the spline serrations 14 and the spline serrations 19. This clearance is filled with nylon-6 forming the resin lining 23 to reduce frictional resistance. The resin lining is formed on either the spline serrations 14 of the external spline 12 or the spline serrations 19 of the internal spline 13.

Prior to the formation of the resin lining 23, a release agent is applied to either the spline serrations 14 of the exernal spline 12 or the spline serrations 19 of the internal spline 13, according to which side is to constitute the substrate for the resin lining. The clearance 22 between the spline serrations 14 and the spline serrations 19 is then filled with the resin lining material, which is molten nylon. The molten nylon fills the clearance completely and an excess 24 of the molten nylon stays in the groove 17, which serves as a well. This arrangement prevents formation of flash 30, as shown in FIG. 2.

The resin lining material in the clearance 22 adheres to either the spline serrations 19 or the spline serrations 14 depending upon which of these components is not coated with a release agent. The resin lining material shrinks during curing to form a very small gap that permits the mutual sliding motion of the two splines.

Example 4

Figure 8:
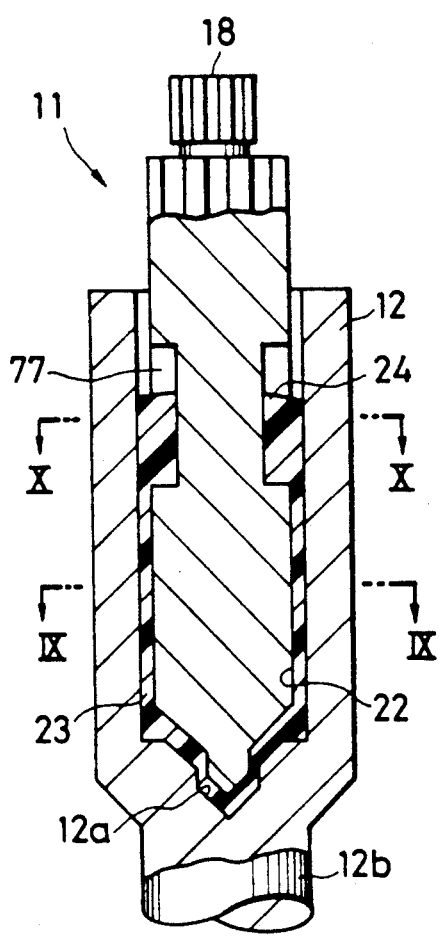
FIG. 8 is a sectional view of the sliding part of Example 4 of this invention.
Figure 10:
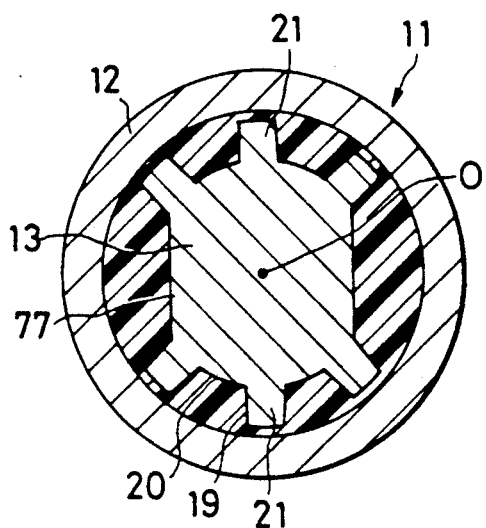
FIG. 10 is an enlarged sectional view taken along the line X—X of FIG. 8.
Figure 9:
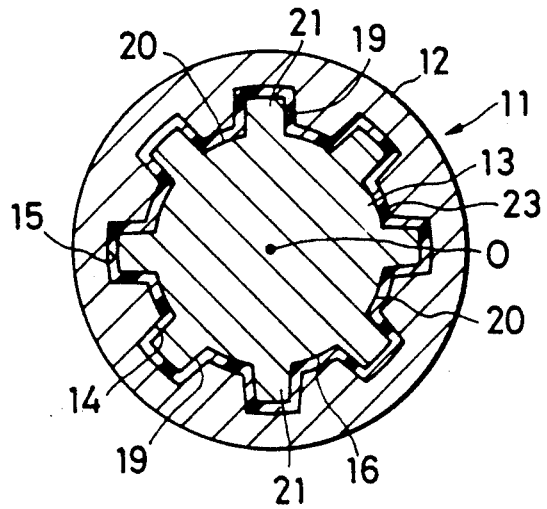
FIG. 9 is an enlarged sectional view taken along the line IX—IX of FIG. 8.

In this example, the sliding part of the invention was in FIGS. 8 applied in the production of a slide spline, as shown to 10. This slide spline is identical to that of Example 3, except that the groove 77 serving as a well for excess resin lining material is formed at the upper portion of the internal spline.

What is claimed is:

1. A method for producing a sliding part comprising, applying a release agent to one of a shaft surface of a shaft and a bearing surface of a bearing, providing a clearance between said shaft surface and said bearing surface, providing a groove on said bearing surface serving as a well for receiving any excess of a low-viscosity monomer or prepolymer from said clearance, fitting said shaft into said bearing with said shaft being rotatably and reciprocatably supported by said bearing surface, pouring solely said low-viscosity monomer or prepolymer into said clearance between said shaft surface and said bearing surface, with any excess thereof being received by said groove, and polymerizing said monomer or prepolymer to form solely a resin lining on one of said shaft surface and bearing surface to which said release agent has not been applied for sliding of said shaft on said bearing surface.

* * * * *